(12) United States Patent
Huang et al.

(10) Patent No.: US 9,017,873 B2
(45) Date of Patent: Apr. 28, 2015

(54) LITHIUM TITANATE COMPOSITE MATERIAL, METHOD FOR MAKING THE SAME, AND LITHIUM ION BATTERY USING THE SAME

(75) Inventors: Xian-Kun Huang, Beijing (CN); Xiang-Ming He, Beijing (CN); Chang-Yin Jiang, Beijing (CN); Dan Wang, Beijing (CN); Jian Gao, Beijing (CN); Jian-Jun Li, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 990 days.

(21) Appl. No.: 13/099,383

(22) Filed: May 3, 2011

(65) Prior Publication Data

US 2012/0164536 A1 Jun. 28, 2012

(30) Foreign Application Priority Data

Dec. 28, 2010 (CN) .......................... 2010 1 0609847

(51) Int. Cl.
*H01M 4/1391* (2010.01)
*H01M 4/485* (2010.01)
*H01M 4/62* (2006.01)
H01M 4/36 (2006.01)

(52) U.S. Cl.
CPC .............. *H01M 4/485* (2013.01); *H01M 4/366* (2013.01); *H01M 4/62* (2013.01); *H01M 4/625* (2013.01); *Y02E 60/122* (2013.01)

(58) Field of Classification Search
USPC ....................................................... 429/231.1
See application file for complete search history.

(56) References Cited

U.S. PATENT DOCUMENTS

| | | | |
|---|---|---|---|
| 7,326,498 B2 | 2/2008 | Park et al. | |
| 2006/0199080 A1 | 9/2006 | Amine et al. | |
| 2007/0148545 A1* | 6/2007 | Amine et al. | ............... 429/231.1 |
| 2012/0088160 A1* | 4/2012 | Zhang et al. | ................... 429/328 |

FOREIGN PATENT DOCUMENTS

| | | |
|---|---|---|
| CN | 1416189 | 5/2003 |
| CN | 101150190 | 3/2008 |
| CN | 101378119 | 3/2009 |
| CN | 101764209 | 6/2010 |
| CN | 101777644 | 7/2010 |

OTHER PUBLICATIONS

J.Cho "Correlation between AlPO4 nanoparticle coating thickness on LiCoO2 cathode and thermal stablility", Electrochimica Acta, 48 (2003), 2807-2811.

* cited by examiner

*Primary Examiner* — Patrick Ryan
*Assistant Examiner* — Lucas J O'Donnell
(74) *Attorney, Agent, or Firm* — Novak Druce Connolly Bove + Quigg LLP

(57) ABSTRACT

A lithium titanate composite material includes a lithium titanate particle and a double layered structure coated on a surface of the lithium titanate particle. The double layered structure includes a carbon layer directly disposed on the surface of the lithium titanate particle, and an $AlPO_4$ layer disposed on an outer surface of the carbon layer. The lithium titanate composite material, as an anode active material, can be applied to a lithium ion battery to increase its electrochemical stability.

11 Claims, 2 Drawing Sheets

LITHIUM TITANATE COMPOSITE MATERIAL, METHOD FOR MAKING THE SAME, AND LITHIUM ION BATTERY USING THE SAME

CROSS-REFERENCE TO RELATED APPLICATIONS

This application claims all benefits accruing under 35 U.S.C. §119 from China Patent Application No. 201010609847.1, filed on Dec. 28, 2010, in the China Intellectual Property Office, the contents of which are hereby incorporated by reference. This application is related to commonly-assigned applications entitled, "LITHIUM TITANATE COMPOSITE MATERIAL, METHOD FOR MAKING THE SAME, AND LITHIUM ION BATTERY USING THE SAME", filed May 3, 2011, Ser. No. 13/099,382, "METHOD FOR MAKING ELECTRODE COMPOSITE MATERIAL", filed Apr. 29, 2011 Ser. No. 13/097,406; "ELECTRODE COMPOSITE MATERIAL AND LITHIUM ION BATTERY USING THE SAME", filed Apr. 29, 2011 Ser. No. 13/097,397, "ELECTRODE COMPOSITE MATERIAL, METHOD FOR MAKING THE SAME, AND LITHIUM ION BATTERY USING THE SAME", filed on Apr. 21, 2011, application Ser. No. 13/032,776.

BACKGROUND

1. Technical Field

The present disclosure relates to a lithium titanate composite material, a method for making the same, and a lithium ion battery using the same.

2. Description of Related Art

Spinel type lithium titanate (e.g., $Li_4Ti_5O_{12}$), as a "zero strain" material used in the anode electrode of lithium ion battery exhibits a high diffusion rate of lithium ions and a high energy conversion efficiency.

The lithium titanate is a semiconductor material having poor electric conductivity. Lithium ion battery having the lithium titanate as its anode active material has a relatively high discharge voltage plateau. When the lithium ion battery is discharged to a low voltage, electrolyte of the lithium ion battery can easily decompose at the anode. The decomposition of the electrolyte results in a decrease of electrochemical stability of the lithium ion battery.

What is needed, therefore, is to provide a lithium titanate composite material used as an anode active material having good electric conductivity and electrochemical stability, a method for making the same, and a lithium ion battery using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings. It should be noted that references to "another," "an," or "one" embodiment in this disclosure are not necessarily to the same embodiment, and such references mean at least one.

Figure 1:
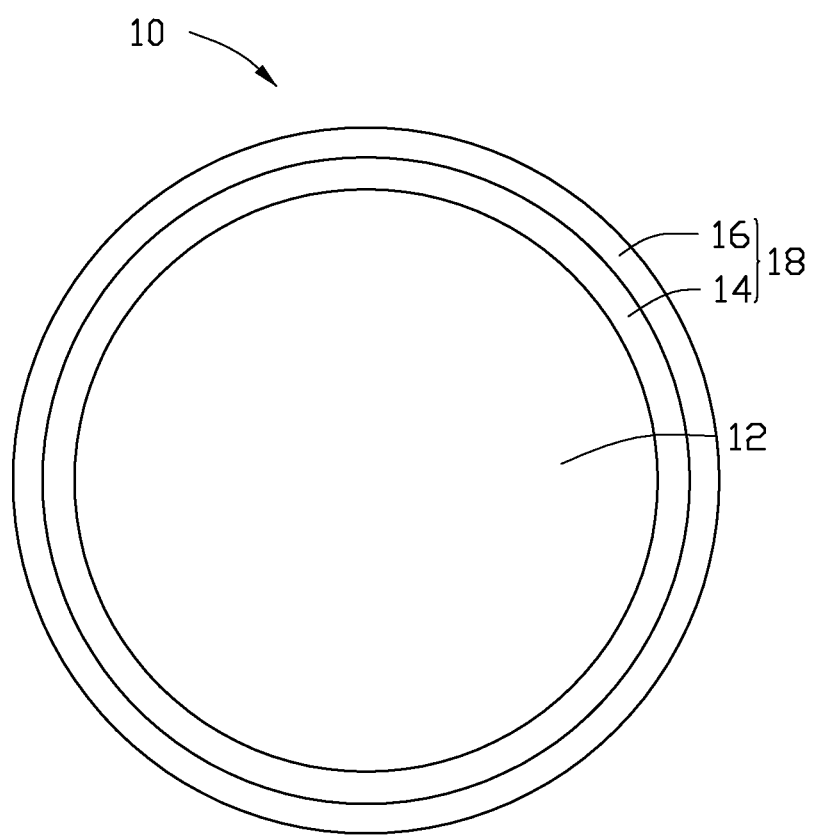
FIG. 1 is a structural schematic view of an embodiment of a lithium titanate composite material.

Referring to FIG. 1, one embodiment of a lithium titanate composite material 10 includes a plurality of lithium titanate particles 12, and a double-layered structure 18 disposed on a surface of the lithium titanate particles 12. The double-layered structure 18 includes a carbon (C) layer 14 directly in contact with the surface of the lithium titanate particles 12, and an aluminum phosphate ($AlPO_4$) layer 16 disposed on an outer surface of the carbon layer 14.

Both the C layer 14 and the $AlPO_4$ layer 16 can have a substantially uniform thickness, and appear as a continuous material layer. The double-layered structure 18 may be entirely coated on the surface of the single lithium titanate particle 12. The C layer 14 may be coated on the entire surface of the single lithium titanate particle 12, and the $AlPO_4$ layer 16 may be coated on the entire outer surface of the C layer 14. In one embodiment, each of the lithium titanate particles 12 has the double-layered structure 18 coated on the surface thereof. A mass percentage of the C layer 14 to the lithium titanate composite material 10 can be in a range from about 0.1 wt % to about 5 wt %. A thickness of the C layer 14 can be in a range from about 5 nanometers (nm) to about 20 nm. Alternatively, the thickness of the C layer 14 can be in a range from about 5 nm to about 10 nm. A mass percentage of the $AlPO_4$ layer 16 to the lithium titanate composite material 10 can be in a range from about 0.05 wt % to about 1 wt %. A thickness of the $AlPO_4$ layer 16 can be in a range from about 2 nm to about 10 nm. Alternatively, the thickness of the $AlPO_4$ layer 16 can be in a range from about 2 nm to about 5 nm. The relationship between the thickness of the C layer 14 and the thickness of the $AlPO_4$ layer 16 can be represented by an equation of 2:1 $T_{C-layer}:T_{AlPO4-layer}$ 2.5:1, wherein $T_{C-layer}$ represents the thickness of the C layer 14, and $T_{AlPO4-layer}$ represents the thickness of the $AlPO_4$ layer 16.

A material of the lithium titanate particles 12 can be doped or undoped spinel type lithium titanate. A chemical formula of the undoped spinel type lithium titanate can be $Li_4Ti_5O_{12}$. A chemical formula of the doped spinel type lithium titanate can be $Li_{(4-g)}M_gTi_5O_{12}$ or $Li_4M_hTi_{(5-h)}O_{12}$, wherein 0<g≤0.33 and 0<h≤0.5. In the formula, M represents at least one chemical element of alkali metal elements, alkaline-earth metal elements, Group-13 elements, Group-14 elements, transition metal elements, and rare-earth elements. In one embodiment, M represents at least one chemical element of Mn, Ni, Cr, Co, V, Ti, Al, Fe, Ga, Nd and Mg. A diameter of the lithium titanate particles 12 can be in a range from about 80 nm to about 10 microns. Alternatively, the diameter of the lithium titanate particles 12 can be in a range from about 100 nm to about 1 micron. In one embodiment, the diameter of the lithium titanate particles 12 is about 100 nm.

A material of the C layer 14 is a conductive simple substance of carbon, such as amorphous carbon, graphite, carbon black, acetylene black, or any combination thereof. A material of the $AlPO_4$ layer 16 is $AlPO_4$.

Figure 2:
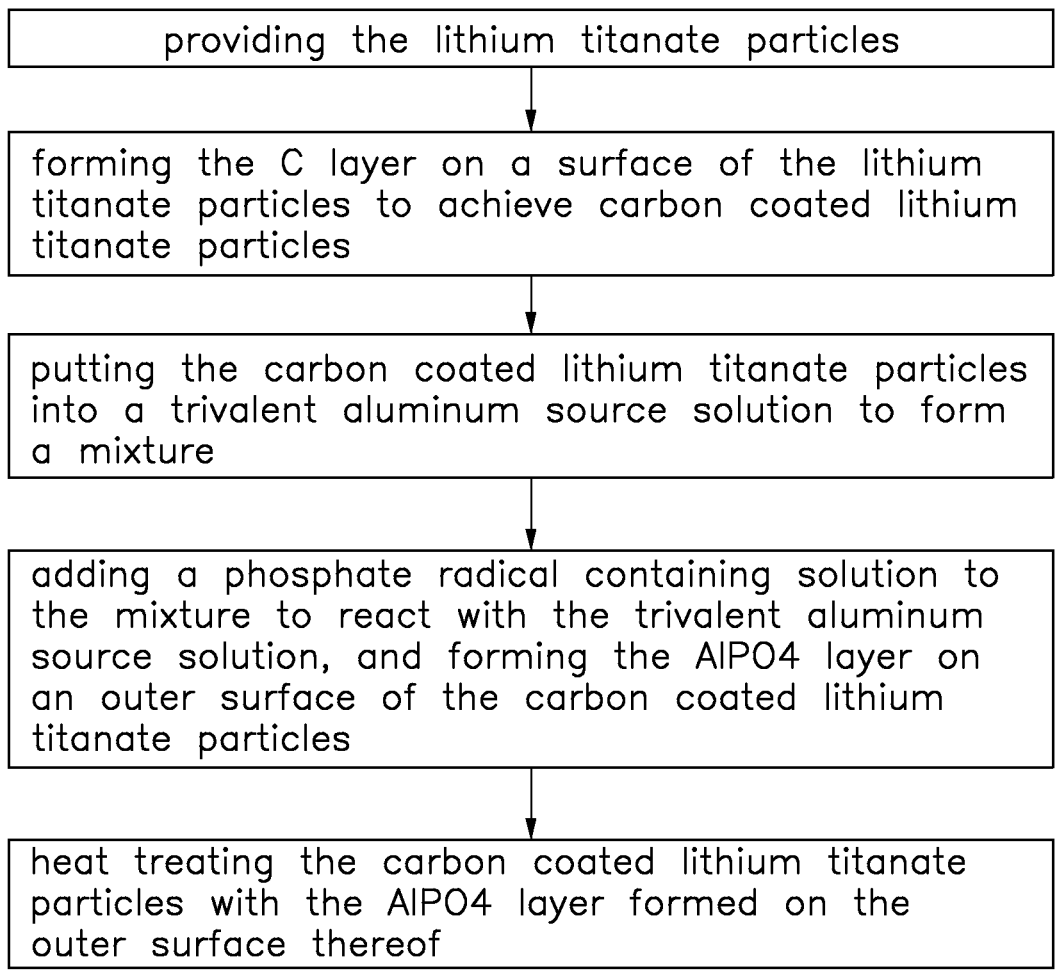
FIG. 2 is a flow chart of an embodiment of a method for making the lithium titanate composite material.

Referring to FIG. 2, one embodiment of a method for making the lithium titanate composite material 10 includes the following steps:

S1, providing the lithium titanate particles 12;

S2, forming the C layer 14 on a surface of the lithium titanate particles 12 to achieve carbon coated lithium titanate particles 12;

S3, putting the carbon coated lithium titanate particles 12 into a trivalent aluminum source solution to form a mixture;

S4, adding a phosphate radical containing solution to the mixture to react with the trivalent aluminum source solution, and forming the AlPO$_4$ layer 16 on an outer surface of the carbon coated lithium titanate particles 12; and S5, heat treating the carbon coated lithium titanate particles 12 with the AlPO$_4$ layer 16 formed on the outer surface thereof.

In step S2, each of the lithium titanate particles 12 may be wholly coated with the C layer 14. In one embodiment, every single lithium titanate particle 12 is wholly coated with the C layer 14. The C layer 14 can be formed on the surface of the lithium titanate particles 12 by the following sub-steps:

S21, providing a carbon source solution;

S22, adding the lithium titanate particles 12 into the carbon source solution to form a layer of carbon source solution coated on the surface of the lithium titanate particles 12, and S23, heat treating the coated lithium titanate particles 12 so that the carbon source cracks into a simple substance of carbon on the surface of the lithium titanate particles 12.

In step S21, the carbon source solution includes a first amount of liquid phase solvent and a carbon source dissolved in the first amount of liquid phase solvent. The first amount of liquid phase solvent can be water or organic liquid phase solvent. In one embodiment, the first amount of organic liquid phase solvent volatilizes easily, and can be at least one of absolute ethanol, acetone, chloroform, diethyl ether, and dichloromethane. Water absorption of the lithium titanate particles 12 may deteriorate the lithium titanate particles 12. Compared with using water, using the first amount of organic liquid phase solvent as the first amount of liquid phase solvent can prevent deterioration of the performance of the lithium titanate particles 12. In one embodiment, the first amount of liquid phase solvent is absolute ethanol.

The carbon source can thermally crack into simple substance of carbon below 700° C. By heating at the temperature, there are no other solid phase substances left except the simple substance of carbon. The carbon source can be an organic surfactant, such as ($C_{24}H_{44}O_6$) or sucrose ester. Span® 80 is sorbitan oleate or sorbitan (Z)-mono-9-octadecenoate. A function of surface activating of the surfactant can effectively reduce the surface tension of the lithium titanate particles 12. Therefore, the surfactant is apt to be absorbed on the surfaces of the lithium titanate particles 12 as a film to coat the lithium titanate particles 12 entirely. The carbon source can also be phenolic resin, epoxy resin, furan resin, polyacrylonitrile, polystyrene naphthalene, or any combination thereof. In one embodiment, the Span® 80 is used as the carbon source. The concentration of the carbon source in the carbon source solution should not be too high or too low. The high concentration of the carbon source may result in an uneven mixing with the lithium titanate particles 12. The low concentration of the carbon source may result in an obvious phase separation between the carbon and the lithium titanate particles 12. The concentration of carbon source in the carbon source solution can be in a range from about 0.005 grams per milliliter (g/ml) to about 0.05 g/ml. In one embodiment, the concentration of the Span® 80 ethanol solution used is about 0.01 g/ml.

In step S22, a ratio by volume of the lithium titanate particles 12 to the carbon source solution can be in a range from about 10:1 to about 30:1. Because the organic solvent in the carbon source solution volatizes, an additional amount of organic liquid phase solvent can be added with the lithium titanate particles 12 into the carbon source solution to provide enough solvent to form a first pasty mixture. By using the first pasty mixture, a thinner thickness of the C layer 14 can be formed on the surface of the lithium titanate particles 12, and the C layer 14 can be tightly combined with the surface of the lithium titanate particles 12. In one embodiment, absolute ethanol is added with the lithium titanate particles 12 to form the first pasty mixture of the lithium titanate particles 12 and the carbon source solution.

The step S22 can further include a step of stirring to evenly mix the lithium titanate particles 12 and the carbon source solution. The stirring step may last from about 20 minutes to about 40 minutes.

The step S22 can further include a step of separating the lithium titanate particles 12 having the layer of carbon source solution coated thereon from the first pasty mixture. In one embodiment, the lithium titanate particles 12 having the layer of carbon source solution coated thereon are centrifugalized out from the first pasty mixture. The solvent remained in the layer of carbon source solution can be removed by heat drying.

In step S23, an even thickness and continuous C layer 14 can be formed on the surface of the lithium titanate particles 12 by heat treating. The carbon source can not crack at a low temperature, and a structure of the lithium titanate particles 12 may be destroyed at a high temperature. Therefore, an appropriate heat treating temperature is needed. Specifically, the heat treating temperature can be in a range from about 300° C. to about 700° C. A time period for the heat treating can be in a range from about 0.5 hours to about 3 hours. In one embodiment, the heat treating temperature is about 400° C., and the heat treating time period is about 2 hours. A thickness of the C layer 14 can be in a range from about 8 nm to about 12 nm. The C layer 14 can be coated on the surface of the lithium titanate particles 12 by other commonly used methods.

In step S4, the phosphate radical containing solution includes a phosphate radical source dissolved in a liquid phase solvent. A trivalent aluminum source in the trivalent aluminum source solution and the phosphate radical source should meet the following conditions: (a) both the trivalent aluminum source and the phosphate radical source are soluble in a liquid phase solvent; (b) the trivalent aluminum source can react with the phosphate radical source to form AlPO$_4$; and (c) other products except the AlPO$_4$ of the reaction between the trivalent aluminum source and the phosphate radical source can be removed by a heating step.

The trivalent aluminum source solution includes a second amount of liquid phase solvent and a trivalent aluminum source dissolved in the second amount of liquid phase solvent. The trivalent aluminum source can be mutually soluble with the second amount of liquid phase solvent. Aluminum ions ($Al^{3+}$) can be dissociated from the trivalent aluminum source in the second amount of liquid phase solvent. The second amount of liquid phase solvent can be water or organic liquid phase solvent. In one embodiment, the second amount of organic liquid phase solvent volatilizes easily, and can be at least one of absolute ethanol, acetone, chloroform, diethyl ether, and dichloromethane. Water absorption of the lithium titanate particles 12 may deteriorate the lithium titanate particles 12. Compared with the water, using the second amount of organic liquid phase solvent as the second amount of liquid phase solvent can prevent deterioration of the performance of the lithium titanate particles 12. The trivalent aluminum source can be aluminum nitrate ($Al(NO_3)_3$) or aluminum isopropoxide ($C_9H_{21}AlO_3$). In one embodiment, the trivalent aluminum source solution is a solution of $Al(NO_3)_3$ dissolved in ethanol.

In step S3, the mixture is a solid-liquid mixture, wherein the carbon coated lithium titanate particles 12 are insoluble in the trivalent aluminum source solution. In the mixture, the $Al^{3+}$ or the trivalent aluminum source exist as molecules uniformly adhered to the outer surface of the C layer 14 of the lithium titanate particles 12.

The step S3 can further include a step of adjusting amounts of the trivalent aluminum source solution and carbon coated lithium titanate particles 12 to form the mixture pasty. The amount of trivalent aluminum source solution in the mixture is only enough to cover the entire outer surface of the single carbon coated lithium titanate particle 12. A gap between the C layer 14 and the $AlPO_4$ layer 16 can be avoided after the step S5 by using the pasty mixture. In one embodiment, the ratio by volume of the trivalent source solution to the carbon coated lithium titanate particles 12 can be in a range from about 1:10 to about 1:40. The amount of trivalent aluminum source solution can be determined by the amount of the $AlPO_4$ layer 16 desired to be formed on the surface of C layer 14 in the lithium titanate composite material 10. In one embodiment, a mass percentage of the $AlPO_4$ layer 16 in the lithium titanate composite material 10 can be in a range from about 0.05 wt % to about 1 wt %. An amount of additional second amount of organic liquid phase solvent can be added with the carbon coated lithium titanate particles 12 into the trivalent aluminum source solution to provide enough solvent for the pasty mixture. In one embodiment, absolute ethanol is added with the carbon coated lithium titanate particles 12 to form the pasty mixture.

In step S4, the phosphate radical containing solution includes a solvent and a soluble phosphate radical containing source dissolved in the solvent. The solvent can be water. The phosphate radical can be orthophosphoric radical ($PO_4^{3-}$), dihydrogen phosphate radical ($H_2PO_4^-$), hydrophosphate radical ($HPO_4^{2-}$), or any combination thereof. The phosphate radical source can be at least one of phosphoric acid ($H_3PO_4$) and ammonium phosphate salts. The ammonium phosphate salts can be at least one of triammonium phosphate (($NH_4$)$_3PO_4$), ammonium dihydrogen phosphate ($NH_4H_2PO_4$), and diammonium hydrogen phosphate (($NH_4$)$_2HPO_4$). An amount of the water in the phosphate radical containing solution can just be as few as possible to have the phosphate radical source totally dissolved therein. A concentration of the phosphate radical containing solution can be in a range from about 0.2 g/ml to about 1 g/ml. In one embodiment, the phosphate radical source is ($NH_4$)$_2HPO_4$, the concentration of the water solution of ($NH_4$)$_2HPO_4$ is about 0.4 g/ml.

When the phosphate radical containing solution is added to the pasty mixture, the phosphate radicals react with $Al^{3+}$ or trivalent aluminum molecules adhered on the outer surface C layer 14, and in-situ, form the continuous $AlPO_4$ layer 16 on the outer surface of the C layer 14. In one embodiment, the phosphate radical containing solution is slowly dripped in the pasty mixture while the pasty mixture is continuously stirred so that the phosphate radicals thoroughly react with the $Al^{3+}$ or trivalent aluminum molecules. A molar ratio of the phosphate radicals to the $Al^{3+}$ or trivalent aluminum molecules can be in a range from about 1:1 to about 3:1. The reacted mixture is continuously kept pasty by adding proper amounts of the second amount of organic liquid phase solvent during the process of adding the phosphate radical containing solution. In one embodiment, ethanol is added to keep the reacted mixture pasty.

In step S5, the C layer 14 and the $AlPO_4$ layer 16 are tightly combined together to form the double-layered structure 18 wholly coated on the surface of the lithium titanate particles 12 by heat treating. A heat treating temperature can be in a range from about 300° C. to about 700° C. A time period for the heat treating can be in a range from about 0.5 hours to about 3 hours. In one embodiment, the heat treating temperature is about 400° C., and the time period for the heat treating is about 2 hours.

The double-layered structure 18 of the lithium titanate composite material 10 can prevent the electron migration between the lithium titanate particles 12 and the electrolyte of the lithium ion battery as well as allow the lithium ions to pass therethrough. Therefore, a decomposition of the electrolyte or solvent can be avoided while lithium ions intercalate into and deintercalate out from the lithium titanate composite material 10 freely at a relatively low discharge voltage or a high charge voltage. Thus, the lithium titanate composite material 10 has an improved electrochemical stability. Further, the C layer 14 improves electric conductivity of the lithium titanate composite material 10.

One embodiment of a lithium ion battery includes a cathode, an anode, and a non-aqueous electrolyte disposed between the cathode and the anode. The cathode includes a cathode current collector and a cathode material layer disposed on a surface of the cathode current collector. The cathode material layer includes a cathode active material. The anode includes an anode current collector and an anode material layer disposed on a surface of the anode. The anode material layer includes an anode active material, wherein the anode active material includes the lithium titanate composite material 10.

The cathode material layer further includes a conductive agent and a binder. The conductive agent and the binder are evenly mixed with the cathode active material. The cathode active material can be at least one of lithium cobalt oxide (e.g., $LiCoO_2$), spinel or layered lithium manganese oxide (e.g., $LiMn_2O_4$, or $LiMnO_2$), lithium iron phosphate (e.g., $LiFePO_4$), lithium nickel oxide (e.g., $LiNiO_2$), lithium nickel manganese oxide (e.g., $LiNi_{1/2}Mn_{1/2}O_2$), and lithium nickel cobalt manganese oxide (e.g., $LiNi_{1/3}CO_{1/3}Mn_{1/3}O_2$).

The anode material layer further includes the conductive agent and the binder. The conductive agent and the binder are evenly mixed with the lithium titanate composite material 10. The double-layered structure 18 may be entirely coated on the individual lithium titanate particle 12 in the lithium titanate composite material 10. The conductive agent can be at least one of graphite, Polyvinylidene Fluoride (PVDF), Polytetrafluoroethylene (PTFE), and Styrene-Butadiene Rubber (SBR). The non-aqueous electrolyte can be a non-aqueous electrolyte solution or a solid electrolyte film. The solid electrolyte film is disposed between the cathode material layer and the anode material layer when applied in the lithium ion battery. Lithium ion battery using the non-aqueous electrolyte solution can further include a separator disposed between the cathode material layer and the anode material layer. The non-aqueous electrolyte solution includes a solvent and an electrolyte salt dissolved in the solvent. The solvent of the non-aqueous electrolyte solution can be at least one of ethylene carbonate (EC), propylene carbonate (PC), ethylmethyl carbonate (EMC), diethyl carbonate (DEC), dimethyl carbonate (DMC), methyl acetate, ethyl acetate, propyl acetate, methyl propionate, ethyl propionate, γ-butyrolactone, tetrahydrofuran, 1,2-Dimethoxyethane, acetonitrile, and Dimethylformamide. The electrolyte salt can be at least one of lithium hexafluorophosphate ($LiPF_6$), lithium tetrafluoroborate ($LiBF_4$), and lithium bis(oxalato) borate (LiBOB). A material of the solid electrolyte film can be lithium iodide (LiI), lithium nitride ($LiN_3$), or a mixture of a polymer matrix and the electrolyte salt. The polymer matrix can be polyoxyethylene (PEO) or Polyacrylonitrile (PAN).

The following example further illustrates the lithium titanate composite material 10 and the method for making the lithium titanate composite material 10.

Example

Approximately 1 g of Span® 80 is dissolved in about 100 ml of absolute ethanol to achieve a Span® 80 ethanol solution. Approximately 100 g of lithium titanate particles having a diameter of about 100 nm are added to and are intensely stirred in the Span® 80 ethanol solution for about 20 minutes to form a first pasty mixture. The Span® 80 coated lithium titanate particles are centrifugalized and are dried to remove the ethanol. The Span® 80 coated lithium titanate particles are then heat treated in the muffle furnace for about 2 hours at about 400° C. in air to achieve the C layer coated lithium titanate particles.

The C layer coated lithium titanate particles are added to and intensely stirred with the $Al(NO_3)_3$ ethanol solution (about 1 g of $Al(NO_3)_3$ dissolved in about 10 ml of ethanol) to form a second pasty mixture. The volumetric ratio of the C layer coated lithium titanate particles to the $Al(NO_3)_3$ ethanol solution is about 20:1. $(NH_4)_2HPO_4$ water solution (about 1 g $(NH_4)_2HPO_4$ dissolved in about 2 ml of water) are then added to the second pasty mixture to react with $Al(NO_3)_3$ to form $AlPO_4$ on the surface of C layer. Additional ethanol is added to the second pasty mixture to make the mixture pasty. A molar ratio of the $(NH_4)_2HPO_4$ to $Al(NO_3)_3$ is about 1:1. The $AlPO_4$—C double layer coated lithium titanate particles are centrifugalized and dried to remove the ethanol, and put in the muffle furnace and heat treated for about 2 hours at about 400° C. in air to achieve the lithium titanate composite material with a "core-double shell" structure. The core is the lithium titanate particle. The double shell is the C layer directly disposed on the surface of the lithium titanate particle and the $AlPO_4$ layer disposed on the outer surface of the C layer.

The lithium titanate composite material fabricated by the method above is cycled in the lithium ion battery as an anode active material. The testing results show that the lithium titanate composite material has good electric conductivity, and the lithium ion battery still has a good electrochemical stability when discharged to about 0 volt.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a lithium titanate composite material, the method comprising:
   providing a plurality of lithium titanate particles;
   forming a carbon layer coated on a surface of the plurality of lithium titanate particles to achieve carbon coated lithium titanate particles;
   putting the carbon coated lithium titanate particles into a trivalent aluminum source solution to form a mixture;
   adding a phosphate radical containing solution to the mixture to react with the trivalent aluminum source solution, and forming the $AlPO_4$ layer on an outer surface of the carbon coated lithium titanate particles; and
   heat treating the carbon coated lithium titanate particles with the $AlPO_4$ layer formed on the outer surface thereof.

2. The method of claim 1, wherein the trivalent aluminum source solution comprises a second amount of liquid phase solvent and a trivalent aluminum source dissolved in the second amount of liquid phase solvent.

3. The method of claim 2, wherein the trivalent aluminum source is aluminum nitrate or aluminum isopropoxide.

4. The method of claim 1, wherein the phosphate radical containing solution comprises water as a solvent and a phosphate radical source dissolved in the water, the phosphate radical source is selected from the group consisting of phosphoric acid, triammonium phosphate, ammonium dihydrogen phosphate, diammonium hydrogen phosphate, and combinations thereof.

5. The method of claim 1, wherein the step of forming the carbon layer comprises:
   providing a carbon source solution comprising a carbon source dissolved in a first amount of liquid phase solvent;
   mixing the carbon source solution with the plurality of lithium titanate particles to form a layer of carbon source solution coated on a surface of each of the plurality of lithium titanate particles; and
   heat treating the coated lithium titanate particles to crack the carbon source into a simple substance of carbon on the surface of each of the plurality of lithium titanate particles.

6. The method of claim 5, wherein the carbon source is selected from the group consisting of sorbitan oleate or sorbitan (Z)-mono-9-octadecenoate, sucrose ester, phenolic resin, epoxy resin, furan resin, polyacrylinitrile, polystyrene naphthalene, and combinations thereof.

7. The method of claim 5, wherein a concentration of the carbon source in the carbon source solution is in a range from about 0.005 g/ml to about 0.05 g/ml.

8. The method of claim 5, wherein the carbon source is sorbitan oleate or sorbitan (Z)-mono-9-octadecenoate.

9. The method of claim 1 further comprising a step of adjusting amounts of the trivalent aluminum source solution and the carbon coated lithium titanate particles to form the mixture pasty.

10. A method for making a lithium titanate composite material, the method comprising:
    providing a plurality of lithium titanate particles;
    forming a carbon layer coated on a surface of the plurality of lithium titanate particles to achieve carbon coated lithium titanate particles;
    putting the carbon coated lithium titanate particles into a trivalent aluminum source solution to form a pasty mixture;
    adding a phosphate radical containing solution to the pasty mixture to react with the trivalent aluminum source solution, and forming the $AlPO_4$ layer on an outer surface of the carbon coated lithium titanate particles; and
    heat treating the carbon coated lithium titanate particles with the $AlPO_4$ layer formed on the outer surface thereof.

11. A method for making a lithium titanate composite material, the method comprising:

providing a plurality of lithium titanate particles and a carbon source solution, the carbon source solution comprising a carbon source dissolved in a first amount of liquid phase solvent;

mixing the carbon source solution with the plurality of lithium titanate particles to form a first pasty mixture; wherein a layer of carbon source solution is coated on a surface of each of the plurality of lithium titanate particles; and heat treating the coated lithium titanate particles to crack the carbon source into a simple substance of carbon on the surface of each of the plurality of lithium titanate particles and to form a carbon layer coated on a surface of the plurality of lithium titanate particles to achieve carbon coated lithium titanate particles;

putting the carbon coated lithium titanate particles into a trivalent aluminum source solution to form a second pasty mixture;

adding a phosphate radical containing solution to the second pasty mixture to react with the trivalent aluminum source solution, and forming the $AlPO_4$ layer on an outer surface of the carbon coated lithium titanate particles; and heat treating the carbon coated lithium titanate particles with the $AlPO_4$ layer formed on the outer surface thereof.

* * * * *